US 7,089,412 B2
Aug. 8, 2006

(12) United States Patent
Chen (10) Patent No.: US 7,089,412 B2
(45) Date of Patent: Aug. 8, 2006

(54) ADAPTIVE MEMORY MODULE (75) Inventor: Kong-Chen Chen, San Jose, CA (US)

(73) Assignee: Wintec Industries, Inc., Fremont, CA (US)

(*) Notice: Subject to any disclaimer, the term of this patent is extended or adjusted under 35 U.S.C. 154(b) by 453 days.

(21) Appl. No.: 10/347,423

(22) Filed: Jan. 17, 2003

(65) Prior Publication Data
US 2004/0143773 A1 Jul. 22, 2004

(51) Int. Cl.
G06F 9/00 (2006.01)
(52) U.S. Cl. .......................................... 713/2
(58) Field of Classification Search ................ 713/2
See application file for complete search history.

(56) References Cited

U.S. PATENT DOCUMENTS

| 5,175,835 A * | 12/1992 | Beighe et al. ............ 711/212 |
| 6,097,883 A * | 8/2000 | Dell et al. ................. 710/301 |
| 6,640,309 B1 * | 10/2003 | Doblar et al. ............. 713/400 |
| 6,650,588 B1 * | 11/2003 | Yamagata ................ 365/222 |
| 6,711,646 B1 * | 3/2004 | Pelissier et al. ........... 710/305 |
| 6,782,451 B1 * | 8/2004 | Tseng ...................... 711/115 |
| 2003/0061528 A1 * | 3/2003 | Blake et al. .............. 713/600 |

OTHER PUBLICATIONS

Intel Corporation, "PC SDRAM Unbuffered DIMM Specification, Rev. 1.0" Feb. 1998.
JEDEC JC42.5 184-pin PC2700 DIMM Taskgroup, "PC2700 SDRAM Registered DIMM, Design Specification, Rev. 0.8," Nov. 2001.

* cited by examiner

Primary Examiner—Chun Cao
Assistant Examiner—Vincent Tran
(74) Attorney, Agent, or Firm—Morgan, Lewis & Bockius LLP (57) ABSTRACT A memory module contains a plurality of memory devices and receives control signals over a memory bus for accessing the memory devices. An adaptive buffering mechanism includes unregistered logic to electrically isolate the received control signals from one or more control drive signals. Register logic substantially synchronizes the control drive signals to a system clock to produce clocked control drive signals. A mode selection mechanism selectively outputs either the control drive signals or the clocked control drive signals to access the memory devices in accordance with a mode selection signal.

23 Claims, 9 Drawing Sheets

ADAPTIVE MEMORY MODULE

FIELD OF THE INVENTION

The present invention relates generally to memory modules, and more specifically, to an adaptive memory module with a buffering mechanism that can be controlled in accordance with the operation requirement or mode of a memory controller to provide buffering or registering functions for the control signals from the memory controller.

BACKGROUND OF THE INVENTION

Present-day computers are requiring more and more memory. This is partly because improvements in CPU performance have outpaced the speed improvements of hard disk drives in the past decade. To improve system performance while minimizing the access to the relatively slow hard drive, large amounts of memory are being added to the computer systems to hold computer programs and data. Also, in addition to more memory, higher-speed memory is increasingly important to ensure that memory bandwidth requirements for ever-increasing CPU speeds can be met.

Memory for computers, such as dynamic random access memory (DRAM), is normally mounted together on a printed circuit board (PCB) to form a memory module. Memory modules come in different sizes and shapes, also referred to as the "form factor." The form factor dictates the number of memory chips that can be assembled on a module, as well as the pin configuration of the module. Examples of memory module configurations include 30- and 72-pin single in-line memory modules (SIMMs), and 168-pin and 184-pin dual in-line memory modules (DIMMs). DIMMs closely resemble SIMMs, with the principal difference being that on a SIMM, pins on opposite sides of the printed circuit board are tied together to form one electrical contact. On a DIMM, in contrast, opposing pins remain electrically isolated to form two separate contacts.

Because they have more contact pins, DIMMs are more popular than SIMMs. DIMMs include such variants as the small-outline DIMM (SO-DIMM) and micro DIMM, which are smaller in PCB area than a regular DIMM and have different pin configurations.

A memory module allows a set of memory chips to be accessed simultaneously (i.e., in parallel) and allows more data bits to be read or written at a time to increase the memory bus bandwidth. For example, a typical 256 MB double data rate (DDR) DIMM contains eight or nine 32 M×8 bit synchronous DRAM chips, utilizes a 184-pin connector, and is capable of transferring 64 or 72 bits of data at a time with a 167 MHz memory bus clock, to achieve a bandwidth of 2700 Megabytes per second. As the number of memory chips in a module increases, the capacitance loading of the memory module on the memory bus also increases, slowing down the memory access.

There are two basic types of memory chips in general—asynchronous and synchronous. Like its name suggests, an asynchronous memory chip does not operate based on any kind of common system clock. The memory controller must manipulate the timings of the data, address, and control signals of asynchronous memory chips to access them. Examples of types of asynchronous memory chips include Fast Page Mode (FPM) DRAM, Extended Data Out (EDO) DRAM, and Flash memory.

In contrast, synchronous memory, like synchronous DRAM (SDRAM), shares the same system clock with the memory controller. This simplifies the timing considerations for memory accesses. All memory transfers are simply referred to the rising and falling edges of the clock. Synchronous memory can also take advantage of the pipelining features enabled by the use of a clock to control memory operations, which make memory retrieval even faster. Synchronous memory modules come in several different speeds synchronized to the system clock they will be used in. For examples, a PC100 SDRAM module runs at 100 MHz on the front-end bus clock in a personal computer, and a PC133 SDRAM module runs at 133 MHz, etc. A double data rate (DDR) SDRAM module, which allows data to be transferred on both the rising and falling edges of the clock cycle, yields an effective data rate of 266 MHz or 333 MHz, at 133 MHz or 167 MHz clocks, respectively.

There are three basic "types" of memory modules: unbuffered, buffered, and registered. These designations refer to how the memory modules process the control and address signals (herein collectively referred to as the "control signals") received over a memory bus from a memory controller.

An unbuffered module is the most common memory module. The memory chips in an unbuffered module can be synchronous or asynchronous. Unbuffered modules are assembled with a set of memory chips on a printed circuit board, but do not have means to re-drive the control singles received from the memory controller. The memory controller must drive the complete set of memory chips on an unbuffered module, which in some cases can be as high as 36 chips per module. When a memory module with 36 chips is inserted into a socket, the memory controller will encounter a 36-times load increase for every address line and control signal it controls. For this reason, a PC motherboard designed to use unbuffered memory modules only supports a very limited number of unbuffered modules—normally, two to four modules.

Figure 1:
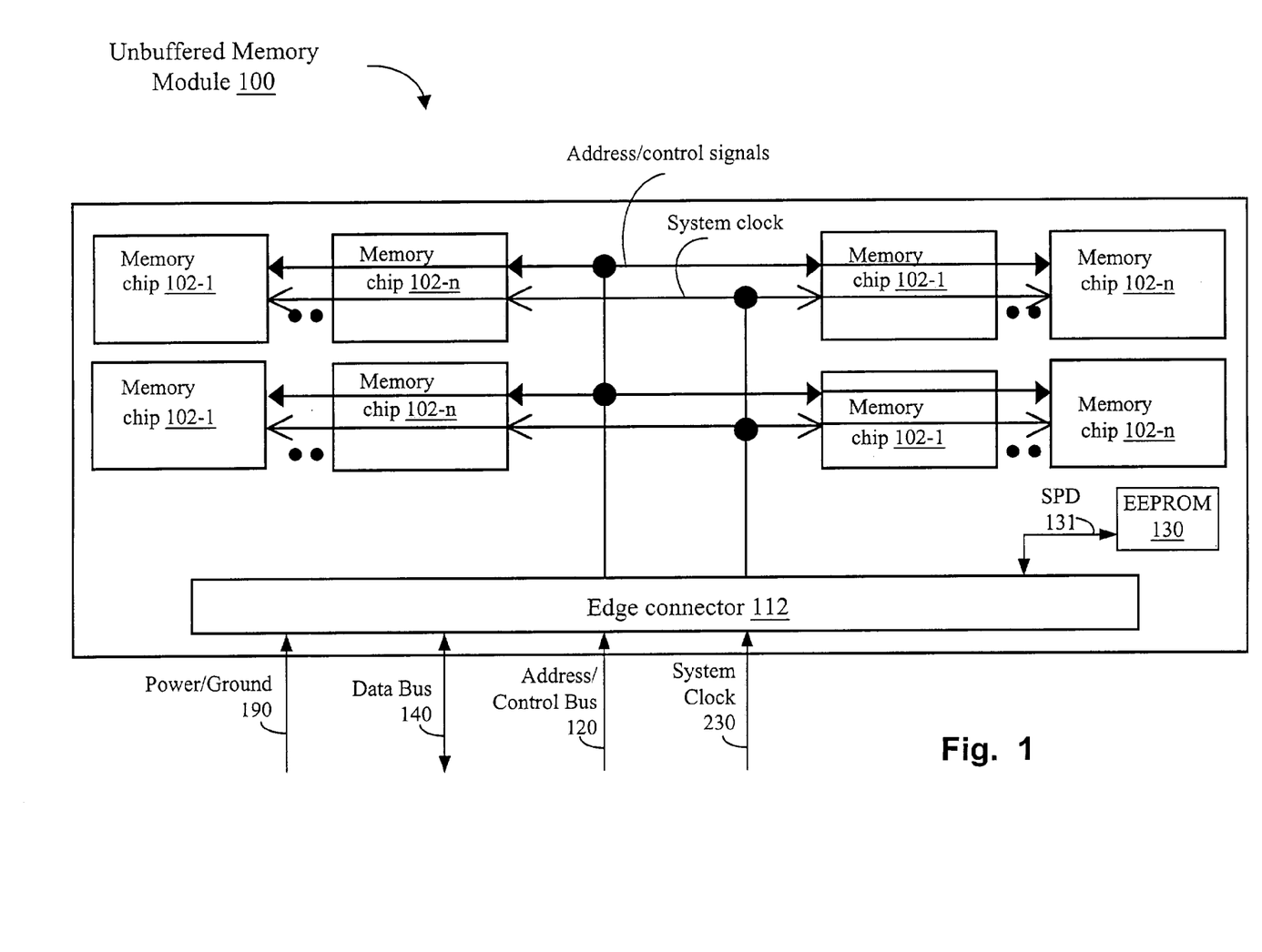
FIG. 1 is a schematic of an unbuffered memory module.

An example of an unbuffered module 100 is shown in FIG. 1. As shown, the unbuffered module contains a set of memory chips 102-1 . . . 102-n, which are directly connected to the edge connector 112 of the PCB (these connections are not explicitly shown). The edge connector 112 contains a set of contact pads, where data bus 140, address and control bus 120, and power and ground 190 are in electrical connection with the module. The unbuffered module may also contain a number of passive components (not shown), such as serial damping resistors for single-ended signals, termination resistors for differential signals, compensation capacitors to balance loading, and decoupling capacitors between power and ground to reduce noise. The module may also contain a set of pull-up/pull-down resistors or a serial EEPROM chip 130 at serial presence detect (SPD) interface 131 that can be queried by the memory controller to obtain module configuration and timing information.

Because the memory chips 102-1 . . . 102-n are directly connected to the contact pads of the edge connector 112, the address/control signals from the memory controller have to drive all of the memory chips. (Only one representative control signal is shown in the figure). Additionally, if the memory chips 102-1 . . . 102-n are synchronous, the system clock signal 230 received by the module (e.g., from the front-end bus clock of a motherboard) provides the timing signal for all of the memory chips on the module.

Without buffers, registers, or other supporting chips, an unbuffered module is the most cost-effective module and is normally used in desktop PCs, where cost is a major concern. However, unbuffered modules may not be able to meet the requirement of future high-speed and high-capacity memory systems because the heavy load on the control signals can slow down the memory bus. Buffered modules and registered modules, while reducing memory bus loading, are more expensive, and are normally reserved for use in servers and other high-end systems.

Buffered modules are used in asynchronous DRAM applications, such as EDO memory modules. A buffered memory module utilizes driver integrated circuits (ICs) or buffers to improve module performance by "re-driving" the control signals in the memory module. Adding buffers to a memory module electrically isolates the memory chips on the module from the memory bus, effectively reducing the loads seen by the memory controller. The buffers also help the memory controller cope with the capacitance load caused by the memory chips on the module. Using a buffered EDO memory module as an example, system performance is improved by having the input control and address signals buffered (except for the RAS# signal and data). The Samsung M372F3200DJ3-C 32 Mx72 EDO DIMM module, for example, uses thirty-six 16 M×4 bits DRAMs and contains two 16-bit driver ICs. Leaving the data and RAS# signals unbuffered preserves the DRAM timing specifications for the module.

Another type of buffering seen in asynchronous DRAM modules is the adding of bus switch ICs to the data bus of the memory module. The bus switch isolates the data signals from the memory bus under system control. Only the data signals of a selected (enabled) memory module are connected to the system data bus, while the data signals of all unselected memory modules are disconnected (e.g., tri-stated) from the data bus by disabling the bus switch buffers. Since an asynchronous memory module does not require a clock signal, there is no Phase Lock Loop (PLL) or similar clock buffer, such as a Delay Locked Loop (DLL), in such a memory module. In some cases, driver ICs and Programmable Logic Devices (PLD) are also added to asynchronous memory modules. For example, the Dataram DRS1500/512 Mezzanine Memory Board, organized as four banks of 8 M×144 bits, consists of seventy-two 8 M×8 bits EDO DRAMs, five 16-bit buffer/drivers, and one programmable logic device (PLD). The PLD controls the WRITE Enable and Output Enable signals to the DRAM chips.

In synchronous memory modules, the system clock controls the timing of data transfers in the memory. The clock is input to every synchronous memory chip on the module. To reduce the loading to the system clock due to the insertion of a memory module, and to control the clock skew among memory chips with respect to the system clock, a PLL or DLL can be added to this type of memory module to synchronize the clock signals among the memory chips. A PLL or DLL takes the system clock input as a reference clock, and regenerates it into multiple outputs with either no delay or a controlled delay, before distributing the clocks to the memory chips on the memory module.

Generally, unregistered driver ICs have not been utilized to reduce the loads of control signals in a synchronous memory module where a PLL or a clock buffer is used. Normally, only register chips or registered buffers are used to buffer the control signals in a synchronous memory module. A synchronous memory module with a PLL and register buffers to register the control signals is referred to as a "registered" memory module.

Figure 2:
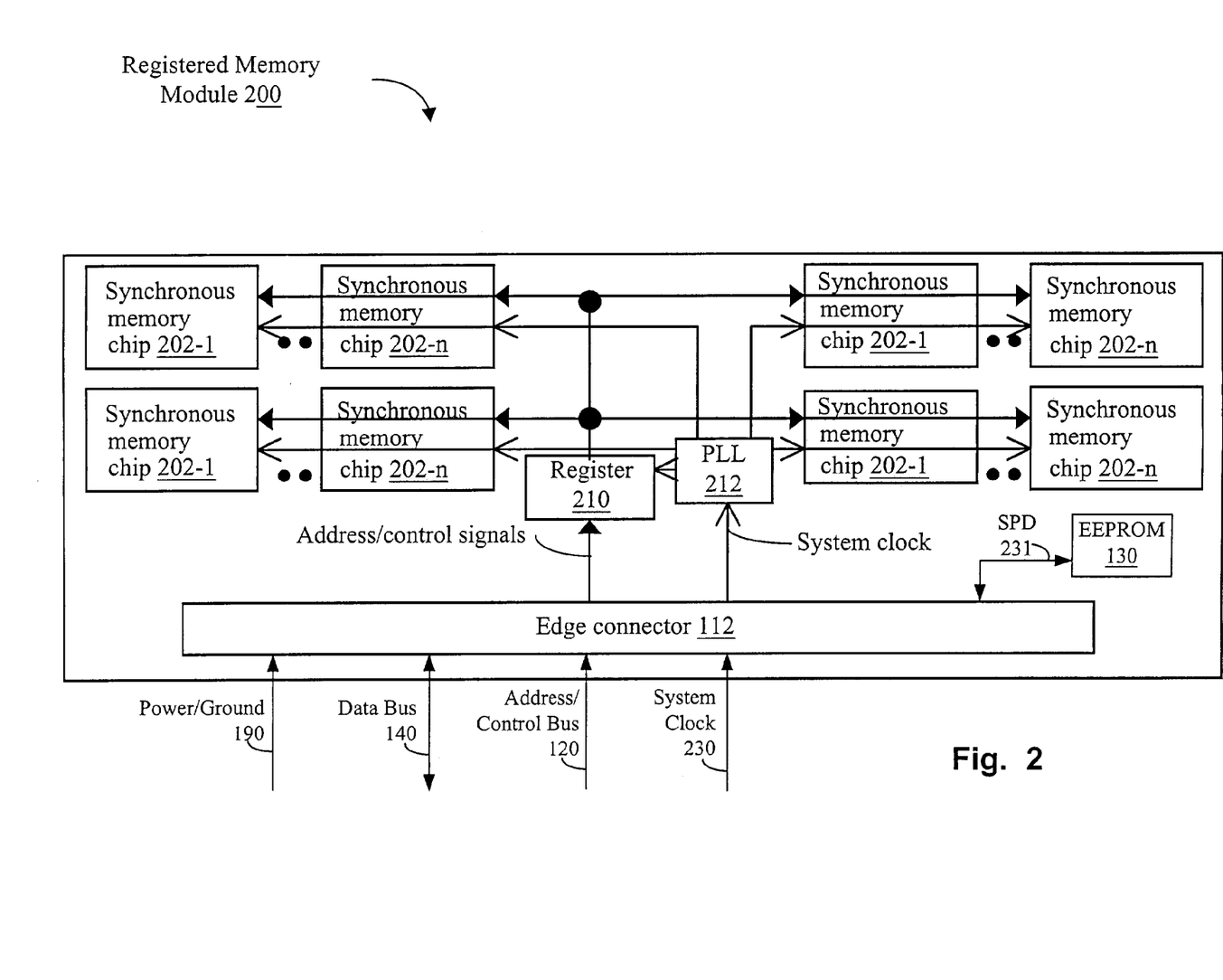
FIG. 2 is a schematic of a registered memory module.

An example of a registered memory module 200 is shown in FIG. 2. The components in a registered memory module include a set of synchronous memory chips 202-1 . . . 202-n, an edge connector 112, passive components (not shown), and a Serial Presence Detect (SPD) EEPROM 130. The edge connector 112 contains a set of contact pads (not shown) for electrically connecting data bus 140, system clock bus 230, address and control bus 120, and power and ground 190 to the module. The edge connector 112 also includes an SPD interface 231. The registered memory module 200 contains more active components than the unbuffered memory module shown in FIG. 1—e.g., register 210 and phase locked loop (PLL) 212. For the registered memory module 200, the address and control signals (from bus 120) drive the register 210, which registers the address and control signals from the memory bus. The register 210 then drives the address and control signals to the synchronous memory chips 202-1 . . . 202-n. PLL 212 receives the system clock (i.e., the reference clock, from system clock bus 230), buffers it, and then distributes it to the register 210 and to all of the synchronous memory chips 202-1 . . . 202-n. PLL 212 acts as a clock buffer, and is also used to minimize the clock skew among the memory devices.

Registered modules are particularly advantageous in servers and high-end workstations where greater amounts of memory are needed, and where the timing requirements are more stringent. A system using registered memory modules can support more memory modules. For example, some motherboards using registered memory modules can have 8 or even 16 memory modules installed on it at one time. This is because every control signal from the memory controller only sees one load for every registered memory module installed in the computing system. This is very different from an unbuffered memory module, where every control signal from the memory controller has to drive all of the memory chips on the memory module. With a lighter load on the memory bus, a shorter cycle time and higher operating frequency is possible for the registered memory modules.

The register chips or the registered buffers in a registered memory module introduce a new pipeline stage to the control signals in the memory access and cause the control signals input to the registered memory module to encounter a delay cycle latency. The delay cycle in the control signals causes a registered memory module to function differently than an unbuffered memory module. As a result, the memory module manufacturers are required to maintain two sets of synchronous memory modules—one for registered applications and one for unbuffered applications.

Each type of memory module—unbuffered, buffered, and registered—has different advantages and disadvantages. Yet, significantly, a memory module of one type cannot be used interchangeably in a system designed to use another type. In other words, systems that are designed to use registered memory modules will not function correctly if unbuffered memory modules are inserted, and vice-versa, principally due to the consideration of an extra delay cycle of the registered memory modules. There are different keying notches on the memory modules and on the system memory sockets to help ensure that only the correct type of memory modules are installed into the system.

SUMMARY OF THE INVENTION

An adaptive memory module contains a plurality of memory devices and receives control signals over a memory bus for accessing the memory devices. An adaptive buffering mechanism includes buffers to electrically isolate the received control signals from one or more control drive signals. Synchronizing logic substantially synchronizes the control drive signals to a system clock to produce clocked control drive signals. A mode selection mechanism selectively outputs the control drive signals or the clocked control drive signals to access the memory devices.

The adaptive memory module can be selectively set to operate in a mode in accordance with an operation requirement of a computing system. In one embodiment, a dual mode memory module combines the functions of a registered memory module and an unregistered memory module in a single module. Multiplexing logic in the module enables the module to operate in a registered mode or in an unregistered mode. The multiplexing logic selects either registered address and control signals or unregistered address and control signals to access the memory chips on the memory module.

In some embodiments registers, latches and/or buffers, interposed between the multiplexing logic and an interface of memory module, electrically isolate the address and control signals on module from a memory bus coupled to the interface, to minimize the capacitance loads on the memory bus when a module is inserted into a memory slot.

In some embodiments an operation mode is selected by controlling a selection control signal used by the multiplexing logic. The selection control signal is controlled or generated using a pull-up or pull-down resistor directly connected to the selection control signal, by using an embedded switch or jumper with a proper pull-up or pull-down at both ends to apply a high or low voltage to the selection control signal, by using external memory controller to control the selection control signal through the contact pad of edge connector, or by using the output from an embedded device (e.g., an embedded controller or programmable device) on the memory module to select the operation mode based on the needs of the system.

In some embodiments, the memory module contains a set of synchronous memory chips, a set of buffers or latches to buffer or latch the address and control signals from a memory controller, and clock synchronization logic. The clock synchronization logic minimizes the skew among the clock inputs to the synchronous memory chips with respect to the input system clock.

BRIEF DESCRIPTION OF THE DRAWINGS

Additional objects and features of the invention will be more readily apparent from the following detailed description and appended claims when taken in conjunction with the drawings.

DESCRIPTION OF THE PREFERRED EMBODIMENTS

In this specification, a "subset" of a thing can mean a portion of the thing, up to and including the entirety of the thing.

Figure 3:
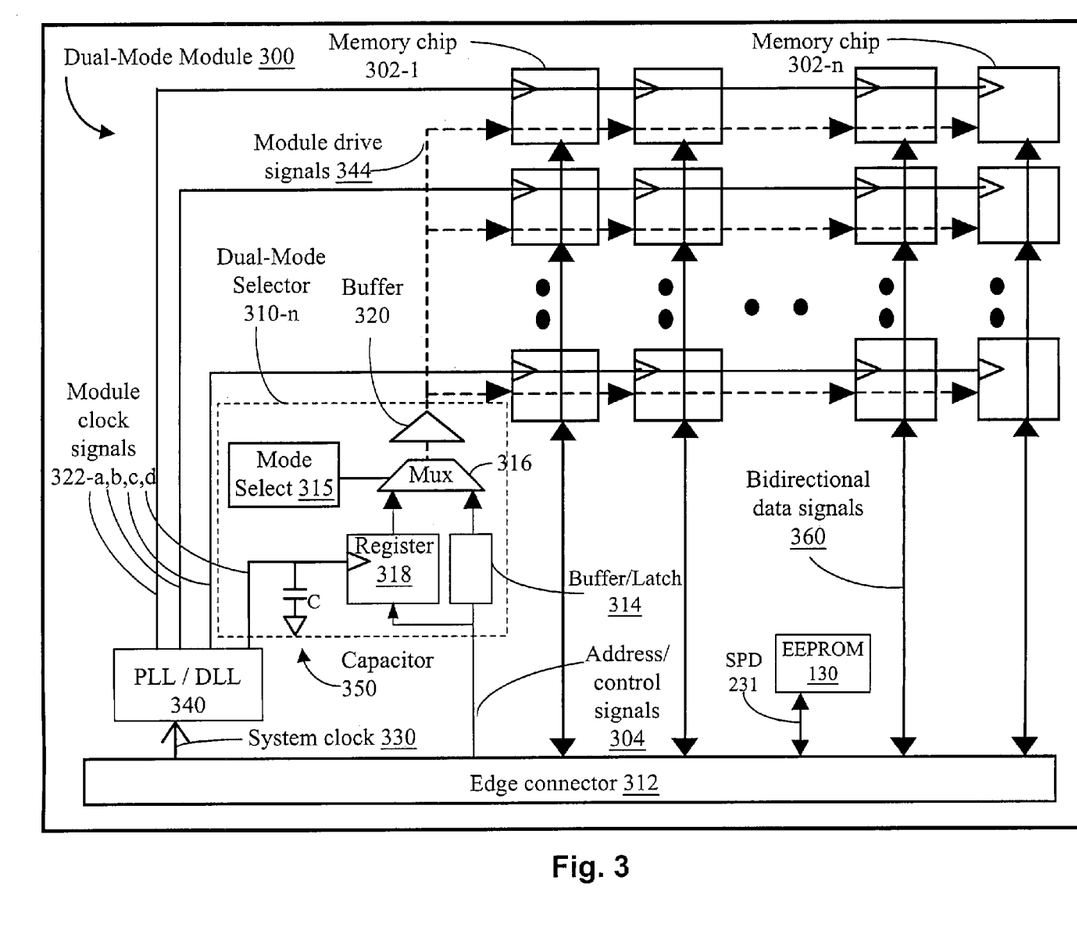
FIG. 3 is a schematic of an adaptive memory module with dual selectable control signals, and more specifically a dual-mode memory module that can operate in a registered mode and an unregistered mode, in accordance with one embodiment of the invention.

Referring to FIG. 3, an example of a dual-mode memory module 300 in accordance with one embodiment of the present invention is shown. The dual-mode module can selectively operate in one of two principal modes, registered and unregistered, by using a built-in selector function. In this context, "unregistered" can mean buffered, latched, or unbuffered. By utilizing dual-mode functionality, the dual-mode module 300 can obviate a memory manufacturer's need for two sets of memory module designs, two sets of printed circuit boards (PCBs), two sets of preparations, and the like, to support two different types of memory modules (e.g., unbuffered modules and registered modules).

Dual-mode memory module 300 contains a set of memory chips 302-1 . . . 0.302-$n$, which are, in one embodiment, synchronous storage devices, such as synchronous DRAM chips, synchronous SRAM chips, or synchronous Flash chips. In other embodiments (not shown), the memory chips are asynchronous. The actual layout of the memory chips 302 within the memory module 300 is dependent on the specific configuration of the module. (The layout shown in FIG. 3 includes multiple sets (rows) of memory chips 302-1 . . . 302-$n$).

Address/control signals 304 from a memory controller, received at the edge connector 312, are used to drive a dual-mode selector mechanism 310-$n$ (also referred to herein as a registered-unregistered mode selector). The edge connector 312 is an interface having a set of contact pads.

As in the memory modules of FIGS. 1 and 2, the edge connector 312 contains a set of contact pads (not shown) for electrically connecting a data bus (not shown), system clock bus (not shown), address and control bus (not shown), and power and ground (not shown) to the module. The edge connector 312 is also connected to an SPD interface 231. The power, ground and data signals are connected to all memory chips in the memory module. In one embodiment, the dual-mode selector mechanism 310-$n$ is an integrated circuit (IC) chip. In other embodiments the dual-mode selector may be implemented as an ASIC, a programmable logic device, or as other discrete digital or analog components. There can be one or multiple dual-mode selector chips. By adding more dual-mode selector chips, a greater number of memory chips 302-1 . . . 302-$n$ can be added to the memory module. This is because each dual-mode selector chip 310-$n$ can drive a subset of the memory chips on the memory module, allowing more memory chips to be accessible without substantially increasing the loading on the memory bus. Or, as shown, a single dual-mode selector chip can drive the entire set of memory chips. Also, depending upon the internal circuitry of each dual-mode selector chip 310 each chip may processes multiple address/control signals in parallel (e.g., an n-bit signal).

The dual-mode selector 310-$n$ contains, in one embodiment, mode-select logic 315, a buffer/latch 314, a multiplexor 316, a register 318, a buffer 320, and an optional capacitor 350. Each of address/control signals 304 received over the memory bus is provided to both the register 318 and the buffer/latch 314. The system clock 330 can be used to clock the register 318 or to enable the latch in buffer/latch 314. Register 318 registers the address and control signals and buffer/latch 314 buffers or latches the same signals. For multiple address and control signals multiple sets of registers and buffers/latches are required, one set for each signal. The mode-select logic 315, which determines whether the dual-mode module is operating in a registered or in an unregistered mode, selects a proper signal to output to buffer 320 through multiplexer 316. Buffer 320 outputs the selected signals as the module drive signals 344 that are then used to drive the memory chips 302-1 . . . 302-$n$. The optional capacitor 350 can adjust the clock timing to the register or latch to adjust the set up and hold time for the address and control signals used in memory access.

The dual-mode module 300 additionally includes an optional phase locked loop (PLL) or delay locked loop (DLL), 340, also referred to herein as a part of clock-synchronization logic. As with the PLL on the registered module 200, PLL/DLL 340 receives the system clock input 330, buffers it to regenerate a set of module clock signals, 322-$a,b,c,d$, and then distributes the clock signals to a subset or all of the memory chips 302-1 . . . 302-$n$. The register 318 and the latch in buffer/latch 314 can also use a PLL/DLL output, e.g., the module clock signal 322-$d$, as the register clock or as the latch enable. The register 318 synchronously registers or delays the address and control signals from a memory controller to meet the latency mode setup of the memory controller. The latch in buffer/latch 314 synchronously buffers the address and control signals with respect to the system clock 330.

In an alternate embodiment, such as a dual-mode memory module with asynchronous memory chips, the memory module does not include PLL/DLL 304 and the system clock 330 from edge connector 312 can be directly used to drive the dual-mode selector 310-$n$.

Figure 4A:
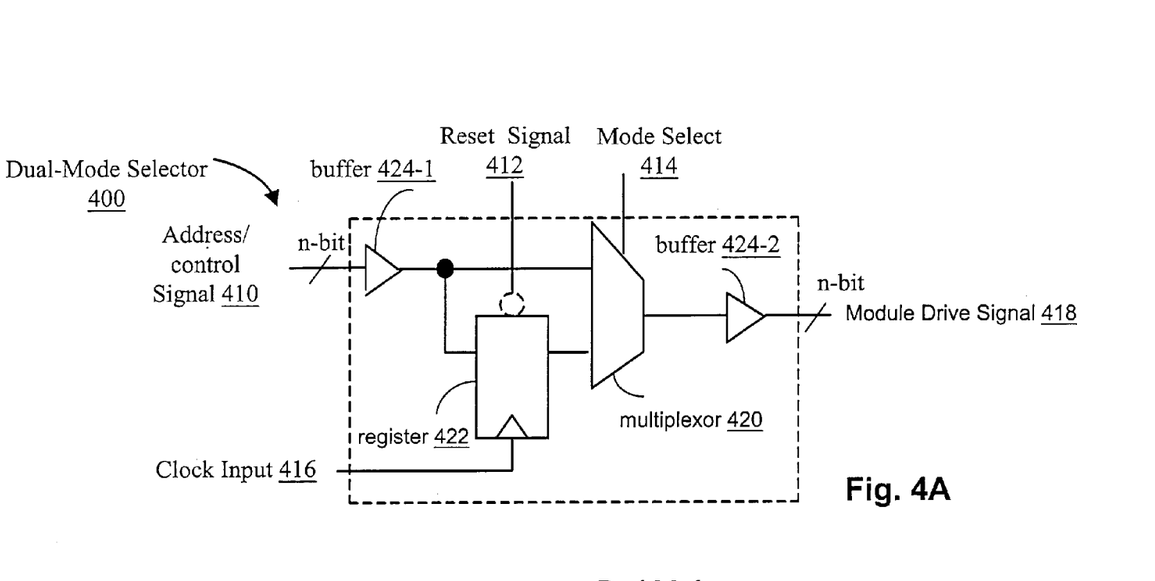
FIG. 4A is a block diagram of an example of a dual-mode selector used in conjunction with the embodiment of the present invention shown in FIG. 3.

Referring to FIG. 4A, another example of a dual-mode selector 400 is shown. In this embodiment, an address/control signal 410 and clock input signal 416 are provided as inputs to the selector 400. The address/control signal 410 may include n-bits, where n is the total number of address and control signal bits received at the module. The address/control signal 410 is first buffered by buffer 424-1, and then provided to both multiplexor 420 and register 422. The register 422, also referred to herein as a part of control-synchronization logic, clocks the output of buffer 424-1 into the register to produce a registered clock output signal, timed to the clock input signal 416. The clock input 416, which may be the system clock, or may be a phase-adjusted module clock signal from a phase locked loop, synchronizes the register output to the clock input 416 (e.g., the system clock).

Mode select signal 414 determines whether the registered output or the buffer output is passed to the output of multiplexor as the module drive signal 418. Potential sources for the mode select signal 414 will be discussed in further detail below. If the multiplexor 420 outputs the registered output signal, then the module drive signal 418 may also be referred to as a registered drive signal or a clocked control drive signal. If the multiplexor 420 outputs the buffered output signal, then the module drive signal 418 may also be referred to as a buffered drive signal, or a control drive signal. In either case, the multiplexor output is buffered by buffer 424-2, and is finally output as the module drive signal 418. One purpose of the buffers 424-1,2 is to electrically isolate the received control signal 410 from the output module drive signal 418.

While one specific embodiment of a dual-mode selector 400 is shown in FIG. 4A, this is only a design-specific implementation, and the invention is not limited to the specific components shown, or their placement. There are a variety of other configurations that would achieve the multi-mode functionality of this particular embodiment of the present invention. For example, instead of connecting the outputs of both a buffer and a register to the multiplexor 420, the multiplexer function could be implemented using tri-state drivers with mutually exclusive enables and outputs that are connected to each other. Further, the register 422 may optionally utilize a reset signal 412 as shown.

In addition, the number of buffers in the dual-mode selector 400 can be increased or decreased, depending on the number of drive signals necessary for a module. In one embodiment, there are no buffers, such that the dual mode selector 400 is effectively a registered-unbuffered mode selector.

As shown in FIG. 4A, the dual-mode selector 400 processes n-bits of the address/control signal at a time. In another embodiment, however, the circuitry shown in the dashed box is repeated as many times as required for each address and control signal that must be buffered or registered on a particular module, to provide for parallel dual-mode determination. In general, the same mode select signal 414 will be used for processing all received control signals. Also, the various inputs and outputs of the registered-unregistered mode selector can utilize single-ended or differential-pair signaling, or any combination of these or other signaling formats.

Figure 4B:
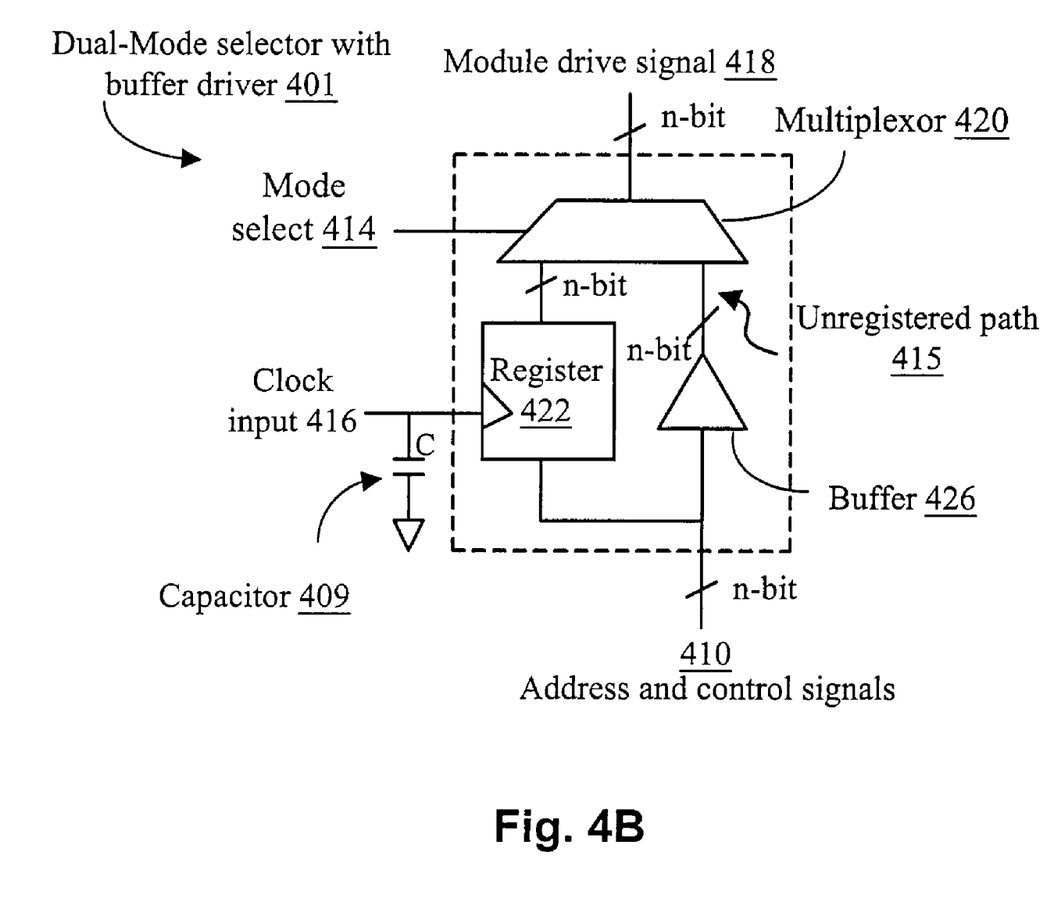
FIG. 4B is a block diagram of a second example of a dual-mode selector used in conjunction with the embodiment of the present invention shown in FIG. 3.
Figure 4C:
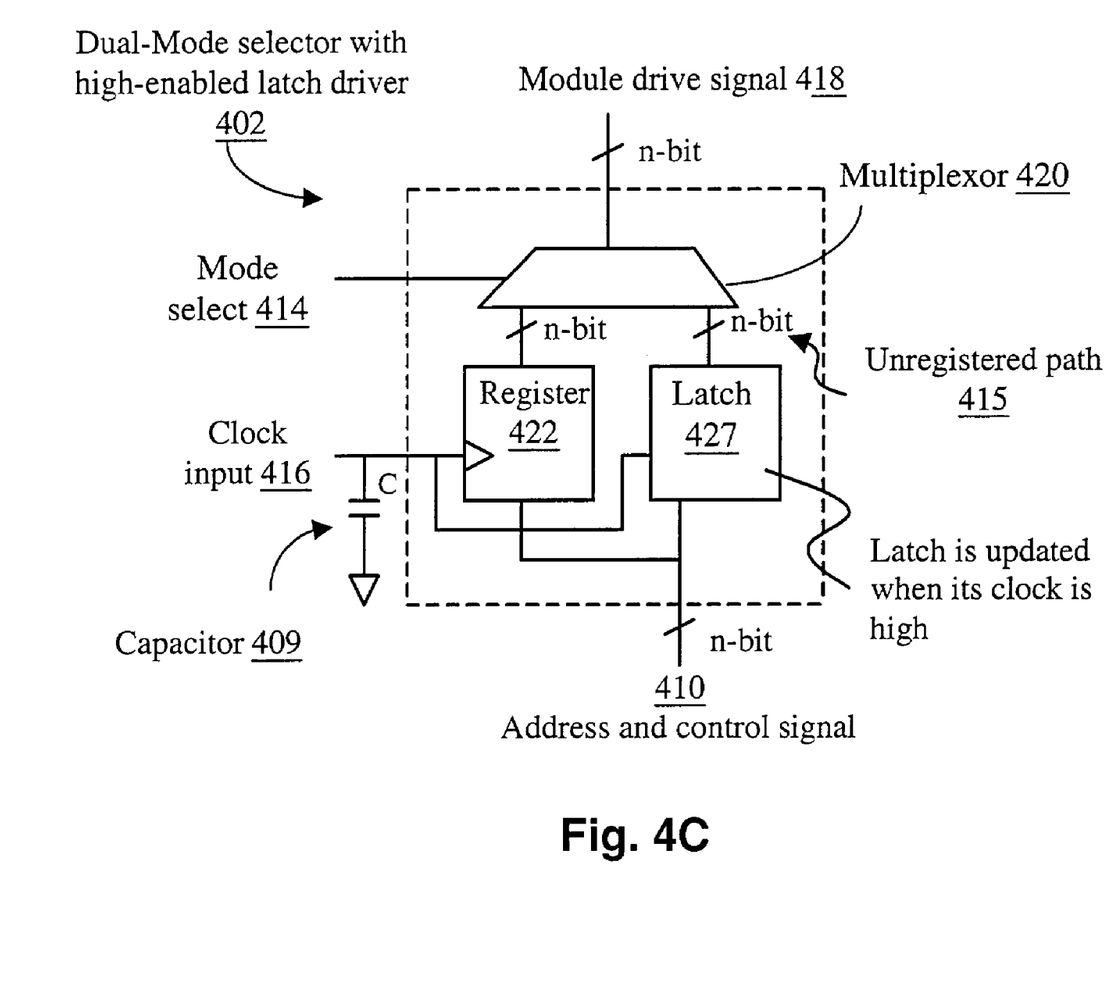
FIG. 4C is a block diagram of a third example of dual-mode selector used in conjunction with the embodiment of the present invention shown in FIG. 3.
Figure 4D:
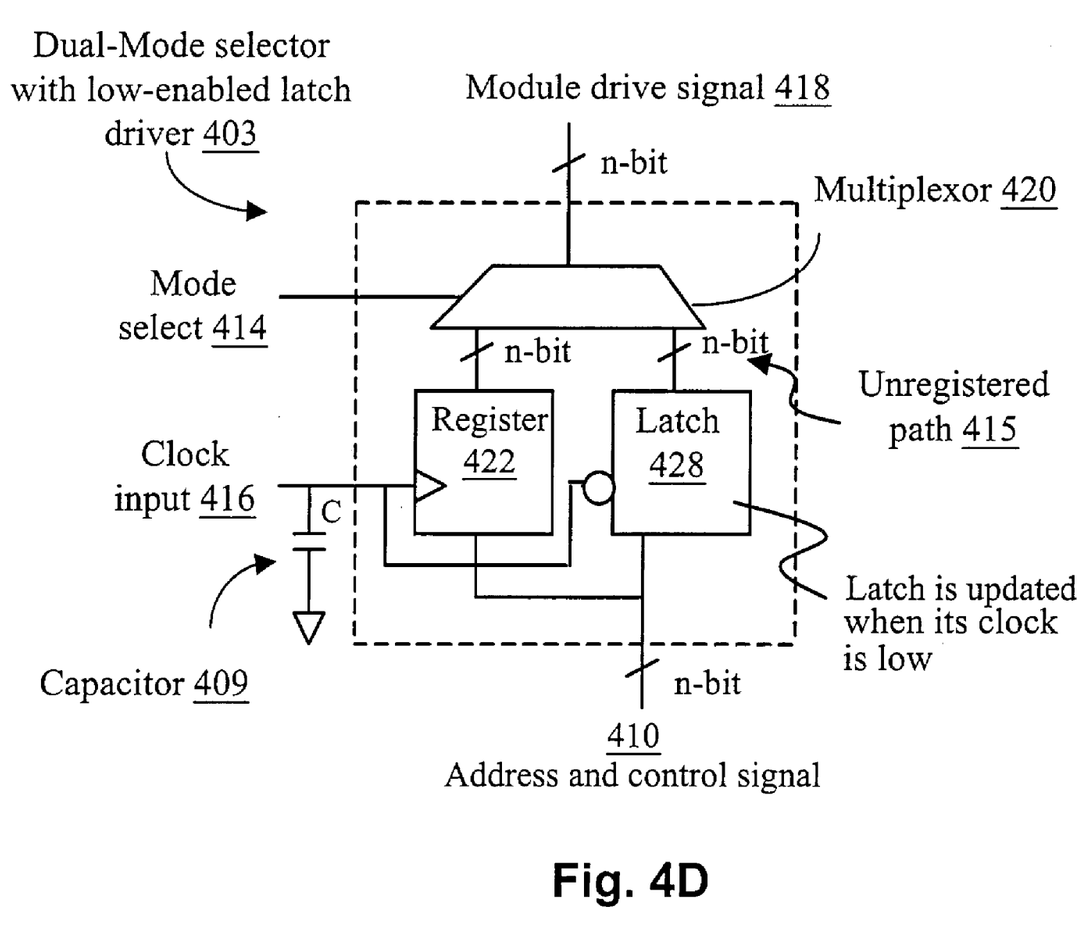
FIG. 4D is a block diagram of a fourth example of dual-mode selector used in conjunction with the embodiment of the present invention shown in FIG. 3.

FIGS. 4B–D show additional embodiments of the dual-mode selector based on different types of logic used in the unregistered signal path 415. In FIG. 4B, a dual-mode selector 401 with a buffer driver 426 is shown. In this embodiment the dual-mode selector 401 receives an n-bit address and control signal 410 from the memory bus, a clock input 416, an optional capacitor 409 to delay the clock input 416, and a mode select signal 414. The unregistered signal path 415 in this embodiment includes an n-bit buffer (or n bit buffers) 426. The mode select signal 414, to be discussed later in conjunction with FIGS. 5A–D, determines whether the register 422 outputs or the signals on the unregistered signal path 415 are passed through multiplexor 420 to become the n-bit module drive signal 418.

In FIG. 4C, a dual-mode selector 402 with a high-enabled latch 427 is shown. This embodiment is similar to the embodiment shown in FIG. 4B, except that the unregistered signal path 415 includes an n-bit latch 427 instead of an n-bit buffer. Also, the clock input 416 is input to the latch 427 as the latch enable control. As the clock input signal 416 goes high, the latch 427 latches the n-bit address/control signal 410 from the memory bus and then outputs that signal to multiplexor 420. Again, the mode-select signal 414 determines whether the register 422 output or the latch 427 output is output by the multiplexor 420 as the module drive signal 418. In this context, a latched drive signal is really a "buffered" drive signal, because the latches operate substantially as buffers when enabled.

FIG. 4D shows a dual-mode selector 403 with a low-enabled latch driver. The principal difference between this embodiment and the one shown in FIG. 4C is that the active low latch 428 in the unregistered path 415 latches the address/control signal input 410 when the clock input signal 416 is low.

Generally, an operation mode for the memory module is selected by controlling the selection control signal to the multiplexing logic, which can be done by using a pull-up or pull-down resistor directly connected to the selection control signal, by using an embedded switch or jumper with appropriate pull-up or pull-down connections at both ends to apply a high or low voltage to the selection control signal, by using an external memory controller to control the selection control signal through a contact pad of the edge connector, or by using the output from an embedded device (e.g., an embedded controller or programmable device) on the memory module to select the operation mode based on the needs of the system. Referring now to FIGS. 5A through 5D, various examples of circuits to control the mode select signal 414 of dual-mode selectors in FIGS. 4A–D are shown.

Figure 5A:
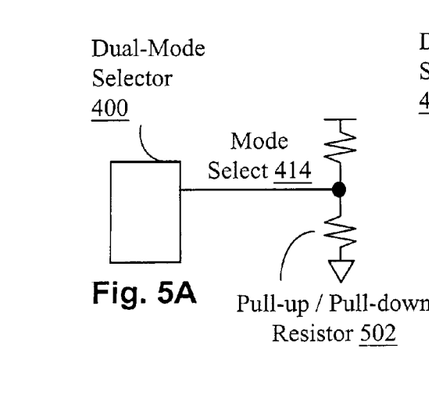
FIG. 5A depicts a circuit for generating a mode select signal using a pull-up or pull-down resistor, for use in conjunction with the dual-mode selector of FIGS. 4A–D.

In FIG. 5A, a pull-up or pull-down resistor 502 is directly connected to the mode select control 414 to ensure a logic-high or logic-low is applied to the mode select control 414. By querying or polling the serial presence detect interface, a memory controller can determine if the module has been set in a proper operation mode to match the latency mode requirement of memory controller. If not, the memory installer can change the setting of the pull-up or pull-down resistor 502 accordingly before memory access operations are performed. The SPD interface can be changed or reprogrammed to match the pull-up/pull-down setting to reflect the mode change.

Figure 5B:
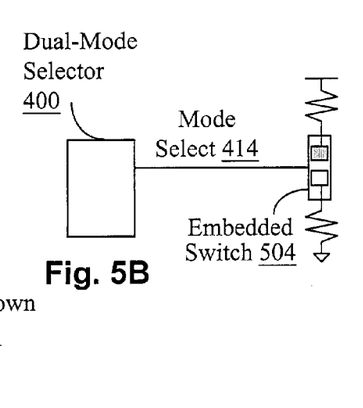
FIG. 5B depicts a circuit for generating a mode select signal using an embedded switch, for use in conjunction with the dual-mode selector of FIGS. 4A–D.

In FIG. 5B, an embedded switch 504 is used to control the mode select signal 414. Proper pull-up and pull-down resistors are connected to the terminals of switch 504. This type of switch can be set by the manufacturer or user to select the operation mode of the memory module in accordance with the latency mode requirement of the memory controller. The same effect can be achieved by the embodiment shown in FIG. 5C, in which a jumper 508 is placed over contact pins 506-a,b, or is removed from the contact pins, to set the mode select signal 414 to a high or low, as appropriate. Again, this may be done at the factory, or the jumper 508 may be placed on (or removed from) the contact pins 506-a,b by the memory-installer as appropriate.

Figures 5C, 5D:
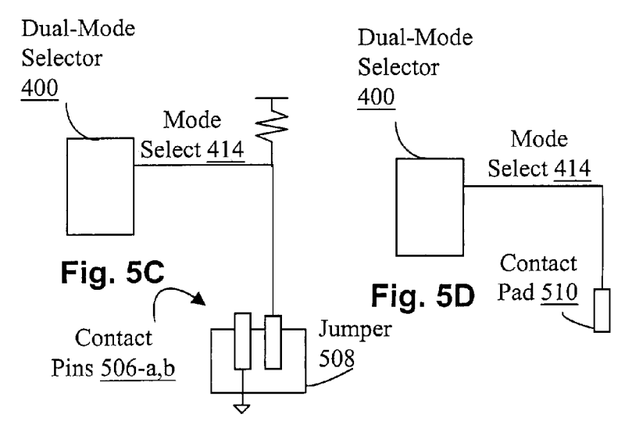
FIG. 5C depicts a circuit for generating a mode select signal using a jumper, for use in conjunction with the dual-mode selector of FIGS. 4A–D.
FIG. 5D depicts a circuit for generating a mode select signal under the control of an external memory controller, for use in conjunction with the dual-mode selector of FIGS. 4A–D.

In FIG. 5D, the mode select signal 414 is directly controlled by a contact pad 510 at the edge connector. In this embodiment, the memory controller or an external chipset can directly set the mode select signal 414 through contact pad 510 to select the operation mode of a memory module, without the need to check the setting of a pull-up/pull-down resistor, switch, or jumper before the module is accessed.

Figure 6:
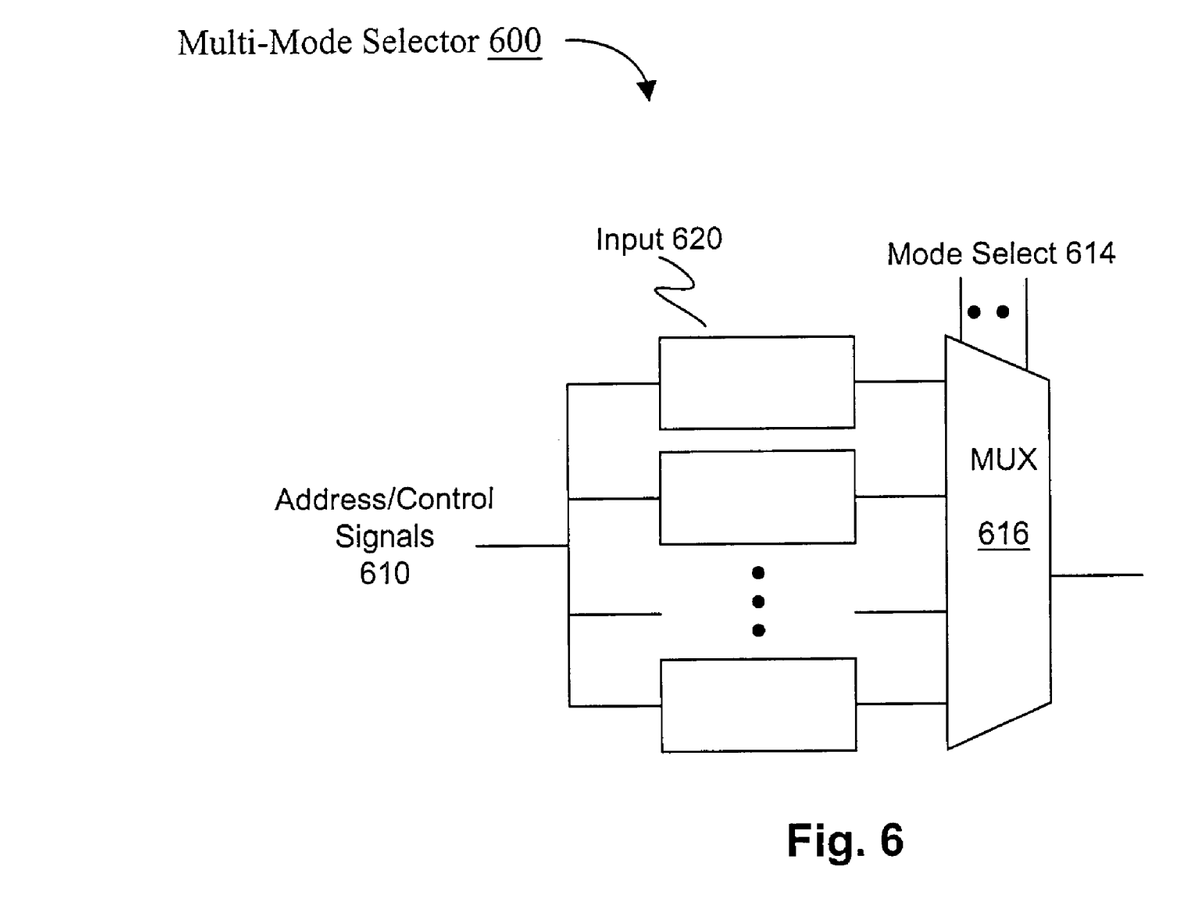
FIG. 6 is a block diagram of a multi-mode selector, for use in conjunction with present invention shown in FIG. 3.

In another embodiment, as shown in FIG. 6, the dual mode selector 310-n in FIG. 3 can be replaced by a multi-mode mode selector 600 with more than two inputs 620 to multiplexer 616, to become a multi-mode memory module. The inputs 620, used to access the memory devices in the memory module, can be the registered address and control signals, the latched address and control signals, the buffered address and control signals, or the address and control signals 610 directly from memory bus. The multi-mode selector 600 enables the memory module to operate in a registered mode, a latched mode, a buffered mode, an unbuffered mode, or any special mode, as appropriate, depending upon the need of the system. The mode select signal 614, which controls the multiplexer 616, can be generated by a set of pull-up/pull-down resistors, a switch or a set of jumpers with proper pull-up and/or pull-down connections, a set of pins at the memory module's edge connector, or a set of outputs from an embedded device on module.

Figure 7:
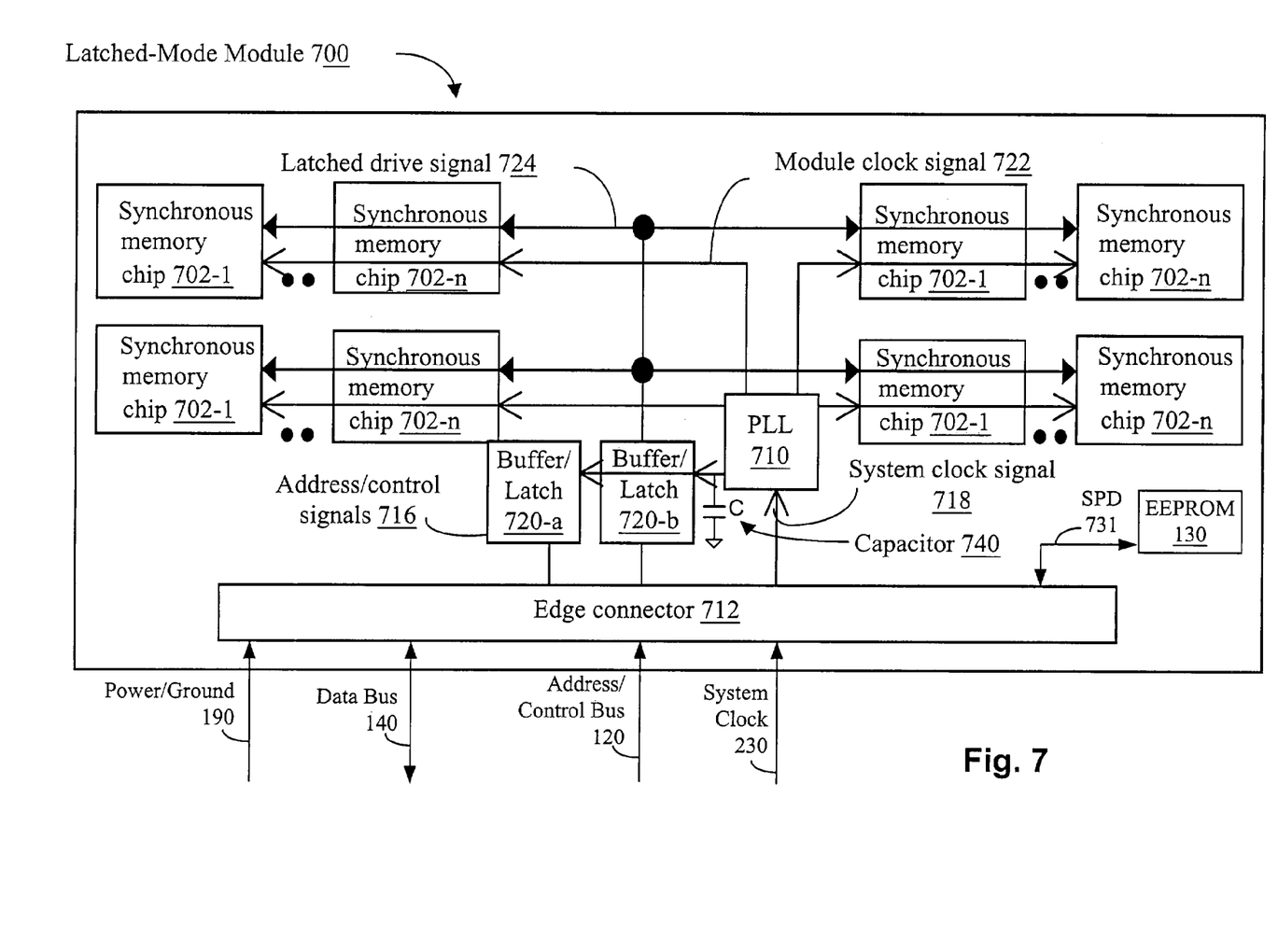
FIG. 7 is a schematic of a buffered-mode synchronous memory module in accordance with another embodiment of the present invention.

In yet another embodiment, the present invention is a buffered synchronous memory module 700, shown in FIG. 7, which contains a set of synchronous memory chips 702-1 . . . 702-n, a set of buffers or latches 720-a,b to buffer or latch the address and control signals 716 received through edge connector 712, and a clock synchronization logic, such as PLL or DLL 710, to clock the operation of synchronous memory chips 702-1 to 702-n.

The edge connector 712 contains a set of contact pads in electrical connection with a data bus 140, system clock bus 230, address/control bus 120, power/ground 190, and optional SPD interface 731. Power/ground signals and data signals are connected to all memory devices on the memory module 700.

The set of buffers or latches are referred to as unregistered drivers. The latch, which is enabled by a module clock signal 722 output from PLL/DLL 710, is a level sensitive device. The output of a latch immediately follows its data input when the latch is enabled. An enabled latch functions like a buffer. The latch holds data output when it is disabled. A latch is different from an edge-triggered register device whose output is updated only at the switching edge of its input clock. The output of a register will not be changed until the next clock cycle with respect to its data input.

The illustrated buffers/latches 720-a,b drive all of the synchronous memory chips 702-1 . . . 702-n, or a subset of them. As shown, buffer/latch 720-b receives the address/control signals 716 from memory controller as inputs, and outputs the buffered/latched drive signals 724 to drive the memory chips, electrically isolating the address and control signals from memory bus. The buffer/latch 720-b effectively reduces the capacitance load of the control signals seen by memory controller and without the extra pipeline delay cycle latency of a registered module.

The clock synchronization logic PLL/DLL 710 receives the system clock input 718, buffers it to generate a set of module clock signals 722, and then distributes the module clock signals to a subset or all of the synchronous memory chips 702-1 to 702-n. The utilization of the PLL/DLL 710 provides clock buffering and reduces skew among the clock inputs of the synchronous memory devices. Thus, with the combination of the buffers 720-a,b and the PLL 710, loading on both the memory bus and the system clock are substantially reduced to improve the timing performance of the module.

While specific implementations of the precepts of the present invention have been disclosed, the invention is not meant to be limited to these specific implementations. Much of the logic disclosed can be implemented in other forms of Boolean equivalence. Also, although parts of the invention can be implemented as an integrated circuit, in other embodiments, the invention may comprise discrete components, or may be modular, or may be divided into functional units that interoperate. In other words, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a module that contains a set of data-storing devices on a printed circuit board, and that receives control signals from an external controller over a bus for accessing the set of data-storing devices, an adaptive buffering mechanism comprising:
   buffers to produce control drive signals from the received control signal and to electrically isolate the control drive signals from the received control signals;
   control-synchronization logic to synchronize the received control signals to a clock to produce clocked control drive signals; and
   a mode selection mechanism to selectively output either the control drive signals or the clocked control drive signals to access the set of data-storing devices on the module;
   wherein the module is compatible with host devices requiring modules having a first mode of operation and host devices requiring modules having a second mode of operation that is incompatible with the first mode, the first mode requiring the module to use the control drive signals to access the set of data-storing devices on the module and the second mode requiring the module to use the clocked control drive signal to access the set of data-stored devices on the module.

2. The adaptive buffering mechanism of claim 1, wherein the mode selection mechanism is configured to receive a mode selection signal from a mechanism within the module.

3. The adaptive buffering mechanism of claim 1, further including:
   clock-synchronization logic configured to provide a module clock to the data-storing devices, the clock-synchronization logic configured to synchronize the module clock with a reference clock.

4. The adaptive buffering mechanism of claim 1, further including:
   clock-synchronization logic configured to provide a module clock to the data-storing devices and the control-synchronization logic, the clock-synchronization logic configured to synchronize the module clock with a reference clock.

5. A memory module, comprising:
   a printed circuit board;
   a plurality of memory devices mounted on the printed circuit board;
   an interface, in electrical communication with the plurality of memory devices, configured to receive from one or more devices outside the memory module a module input clock signal, address, control and data signals;
   register logic, configured to receive at least a subset of the address and control signals, and configured to output registered drive signals, the register logic electrically interposed between the plurality of memory devices and the interface;
   unregistered logic, coupled to the interface to receive at least the subset of the address and control signals, and configured to output unregistered address and control signals, the unregistered logic electrically interposed between the plurality of memory devices and the interface;
   a registered-unregistered mode selector configured to output to the plurality of memory devices the registered drive signals when an operating mode of the memory module is a registered mode, and is configured to output to the plurality of memory devices the unregistered address and control signals when the operating mode of the memory module is an unregistered mode;
   wherein the memory module is compatible both with host devices requiring unregistered memory modules and with host devices requiring registered memory modules.

6. The memory module of claim 5, wherein the unregistered logic includes buffers that output unregistered address and control signals, and that electrically isolate the subset of the address and control signals from the unregistered address and control signals.

7. The memory module of claim 5, wherein the unregistered logic includes latches that output unregistered address and control signals, and that electrically isolate the subset of the address and control signals from the unregistered address and control signals.

8. The memory module of claim 5, wherein the unregistered logic includes a wired interconnect that connects the subset of the address and control signals to the unregistered address and control signals.

9. The memory module of claim 5, wherein the register logic includes registers that store the subset of the address and control signals when clocked by a clock signal and that output the registered drive signals.

10. The memory module of claim 5, wherein the plurality of memory devices are synchronous memory devices;
    the memory module including clock-synchronization logic responsive to a reference clock signal received by the memory module to produce one or more module clock signals to drive the synchronous memory devices in the memory module.

11. The memory module of claim 10, wherein the unregistered logic includes latches that output unregistered address and control signals; wherein each of the latches are configured to receive one of the one or more module clock signals and to perform latching in accordance with a state of the received module clock.

12. The memory module of claim 10, wherein the clock-synchronization logic includes a phase locked loop.

13. The memory module of claim 5, including additional logic, coupled to the interface to receive at least the subset of the address and control signals, and configured to output additional address and control signals, the additional logic electrically interposed between the plurality of memory devices and the interface;
    wherein the registered-unregistered mode selector is further configured to output to the plurality of memory devices the additional address and control signals when an operating mode of the memory module is an additional mode.

14. The memory module of claim 13, wherein the additional logic includes a wired interconnect that connects the subset of the address and control signals to the additional address and control signals.

15. A DRAM memory module for storing data, the memory module configured to receive control signals from a memory controller over a memory bus, the memory controller operating in either a registered or an unregistered mode, the memory module comprising:
    a printed circuit board;
    a plurality of DRAM memory chips mounted on the printed circuit board, the plurality of DRAM memory chips being controlled by module drive signals;
    an adaptive buffering mechanism that outputs the module drive signals that control the plurality of DRAM memory chips, the adaptive buffering mechanism comprising:

buffers configured to generate buffer output signals from control signals received over the memory bus and to electrically isolate the buffer output signals from the control signals received over the memory bus;

registers configured to store in registers the control signals and to output register output signals at times controlled by a clock signal; and a selection circuit configured to select, in accordance with a mode select signal, from between the buffer output signals and the register output signals and to output the selected signals as at least a portion of the module drive signals, the mode select signal having at least two distinct possible mode values;

wherein the DRAM memory module is compatible both with host devices requiring modules have a first mode of operation and host devices requiring modules having a second mode of operation that is incompatible with the first mode, the first mode comprising a registered mode of operation in which the module uses the register output signals to access the DRAM memory chips of the DRAM memory module and the second mode comprising an unregistered mode of operation in which the module uses the buffer output signals to access the DRAM memory chips of the DRAM memory module.

16. The DRAM memory module of claim 15, including a clock generator driven by a system clock received over the memory bus, the clock generator generating the clock signal that controls the registers.

17. The DRAM memory module of claim 16, wherein the clock generator comprises a phase locked loop for substantially synchronizing the clock signal with the system clock.

18. The DRAM memory module of claim 16, wherein the plurality of memory devices are synchronous memory devices; and the clock generator includes clock-synchronization logic responsive to the system clock signal to produce one or more module clock signals to drive the synchronous memory devices in the memory module.

19. The DRAM memory module of claim 15, wherein the mode select signal is generated by a device internal to the DRAM memory module, wherein the device comprises circuitry selected from the group consisting of a switch circuit and a jumper circuit.

20. The DRAM memory module of claim 15, wherein the mode select signal is generated by a device internal to the DRAM memory module, wherein the device comprises circuitry selected from the group consisting of a pull up circuit and a pull down circuit.

21. A memory module, comprising:
a printed circuit board;
a plurality of synchronous memory chips mounted on the printed circuit board, wherein the plurality of synchronous memory chips receive a module clock;
an interface configured to receive from one or more devices outside the memory module an input clock signal, address, control and data signals;
an unclocked buffer for receiving the address and control signals as inputs, and for generating module drive signals as outputs, the unclocked buffer electrically isolating the received address and control signals from the module drive signals; and
clock-synchronization logic for substantially synchronizing the module clock received by the plurality of synchronous memory chips with the input clock signal received by the memory module;
wherein the module drive signals drive a plurality of inputs of the plurality of synchronous memory chips while the module clock is received from the clock-synchronization logic by the plurality of synchronous memory chips.

22. The memory module of claim 21, wherein the clock-synchronization logic includes a phase locked loop.

23. A memory module, comprising:
circuitry mounted on a printed circuit board, the circuitry including:
an interface configured to receive from one or more devices outside the memory module an input clock signal, address, control and data signals;
latches that output latched address and control signals, and that electrically isolate the received address and control signals from the latched address and control signals;
wherein the latched address and control signals drive a plurality of inputs of the plurality of synchronous memory chips; and
clock-synchronization logic for substantially synchronizing the module clock received by the plurality of synchronous memory chips with the input clock signal received by memory module, such that the module clock has a predefined phase relationship with the system clock signal;
wherein each of the latches is configured to receive the module clock signal generated by the clock-synchronization logic and to perform latching in accordance with a state of the received module clock.

* * * * *

UNITED STATES PATENT AND TRADEMARK OFFICE
CERTIFICATE OF CORRECTION

PATENT NO. : 7,089,412 B2
APPLICATION NO. : 10/347423
DATED : August 8, 2006
INVENTOR(S) : Kong-Chen Chen It is certified that error appears in the above-identified patent and that said Letters Patent is hereby corrected as shown below:

Column 14, line 28, please insert the following as a new subparagraph:

-- a plurality of synchronous memory chips wherein the plurality of synchronous memory chips receive a module clock; --

Column 14, after line 47, please insert the following:

-- 24. The DRAM memory module of claim 15, wherein the model select signal is a signal received, via an interface of the DRAM memory module, from a device external to the DRAM memory module.

25. The DRAM memory module of claim 15, wherein the mode select signal is an output from an embedded device on the DRAM memory module. --

Signed and Sealed this

Twenty-seventh Day of March, 2007

JON W. DUDAS
*Director of the United States Patent and Trademark Office*